United States Patent
Biggs

(10) Patent No.: US 12,194,556 B2
(45) Date of Patent: Jan. 14, 2025

(54) THREAD REPAIR HAND TOOL

(71) Applicant: Beau Biggs, Clinton, TN (US)

(72) Inventor: Beau Biggs, Clinton, TN (US)

( * ) Notice: Subject to any disclaimer, the term of this patent is extended or adjusted under 35 U.S.C. 154(b) by 236 days.

(21) Appl. No.: 18/097,325

(22) Filed: Jan. 16, 2023

(65) Prior Publication Data

US 2024/0238887 A1     Jul. 18, 2024

(51) Int. Cl.
*B23G 9/00*     (2006.01)

(52) U.S. Cl.
CPC .................. *B23G 9/009* (2013.01)

(58) Field of Classification Search
CPC . B23G 9/009; B23G 1/28; B23G 1/30; B23G 7/00; B23G 7/02; B23G 2200/142; B21H 3/02; B21H 3/022; B21H 3/04; B21H 3/042; B21H 3/046; B21H 3/06; B25F 1/02; B25F 1/04
See application file for complete search history.

(56) References Cited

U.S. PATENT DOCUMENTS

| | | |
|---|---|---|
| 3,025,540 A | 3/1962 | Wallace |
| 4,201,503 A | 5/1980 | Nannen |
| 4,346,491 A | 8/1982 | Kraus et al. |
| 5,060,330 A | 10/1991 | Stahl |
| 5,803,676 A | 9/1998 | Wienss |
| 6,921,236 B2 | 7/2005 | Rahberger |
| 9,079,262 B2 | 7/2015 | Dilachian |
| 9,657,765 B2 | 5/2017 | Steffi |
| 10,183,372 B2 | 1/2019 | Lewis et al. |
| 10,337,551 B2 | 7/2019 | Foerster, Jr. |
| 2012/0201617 A1* | 8/2012 | Knecht .................. B23G 9/009 408/1 R |
| 2012/0318107 A1 | 12/2012 | Mann |
| 2013/0303294 A1 | 11/2013 | Yamaguchi |
| 2014/0334899 A1* | 11/2014 | Steffl ..................... F16B 37/002 411/432 |

FOREIGN PATENT DOCUMENTS

| | | |
|---|---|---|
| AU | 2016297794 B2 | 2/2017 |
| WO | 2016133143 A1 | 8/2016 |

\* cited by examiner

*Primary Examiner* — Debra M Sullivan
(74) *Attorney, Agent, or Firm* — Robinson IP Law, PLLC

(57) ABSTRACT

A thread repair hand tool for rapidly repairing damaged threads on a threaded rod, the tool including a shell member and a core member to move inside the shell member to separate or combine a pair of threaded semi-circular arc sections.

7 Claims, 6 Drawing Sheets

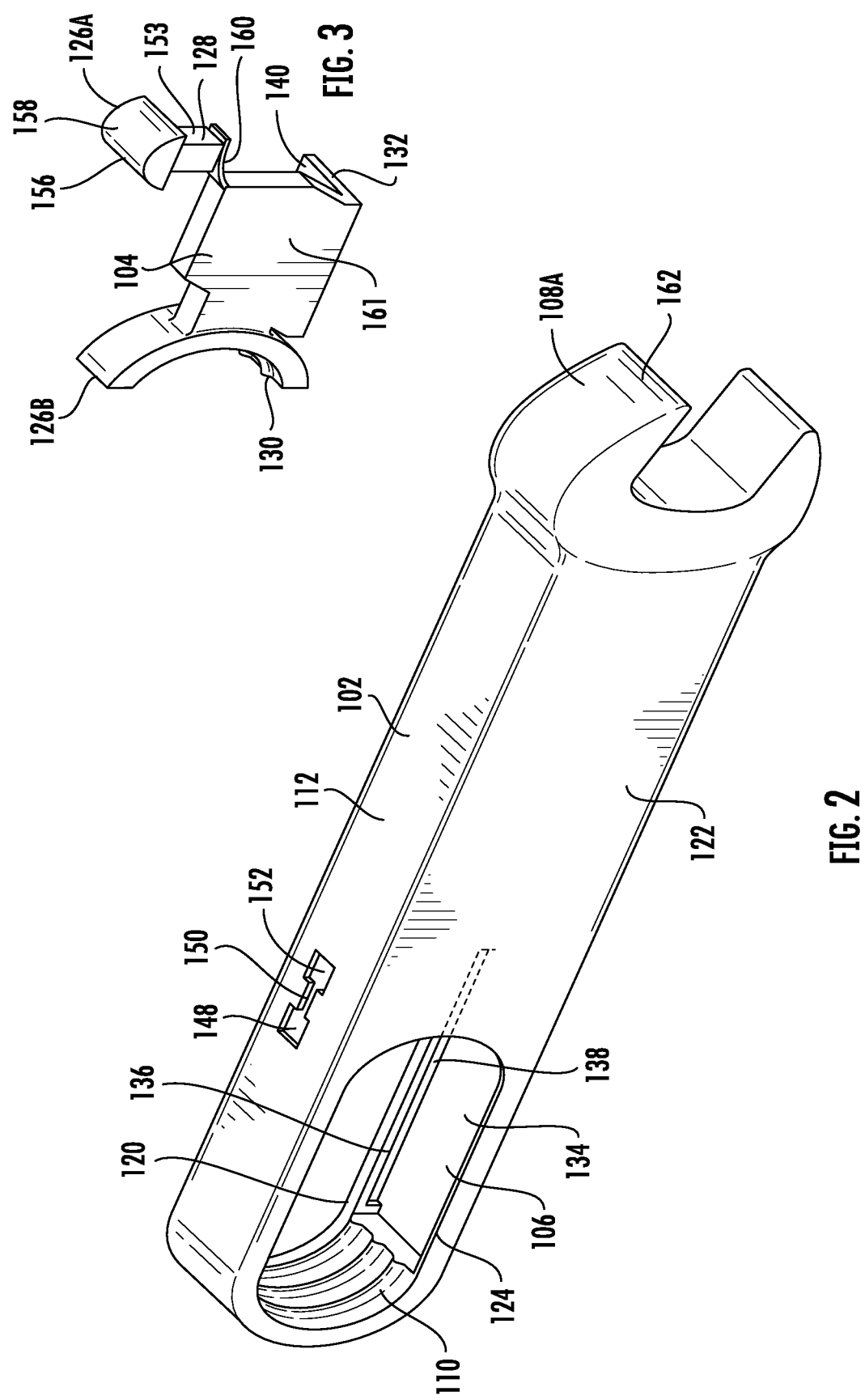

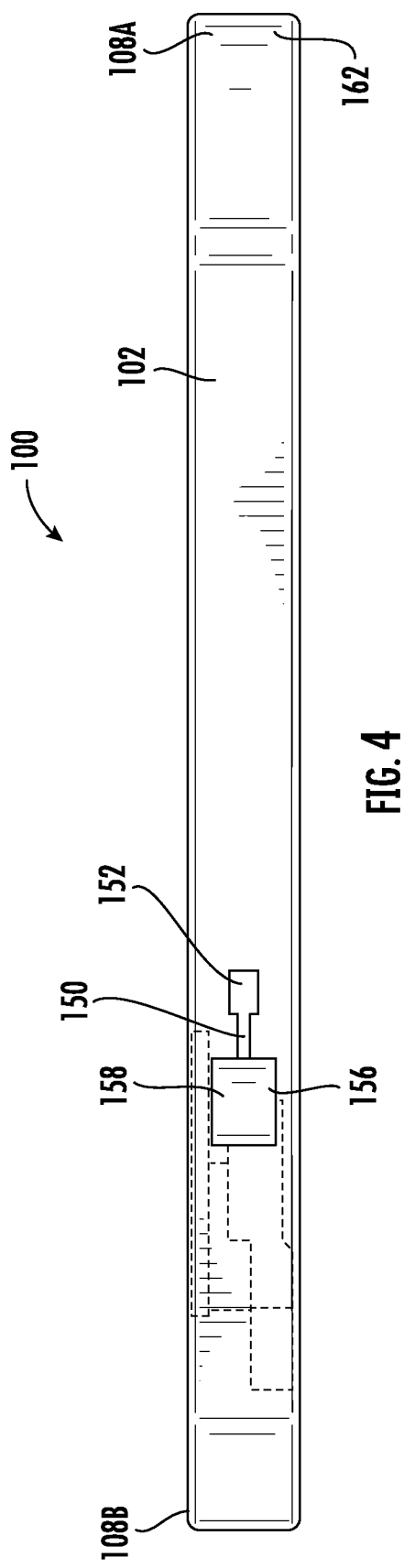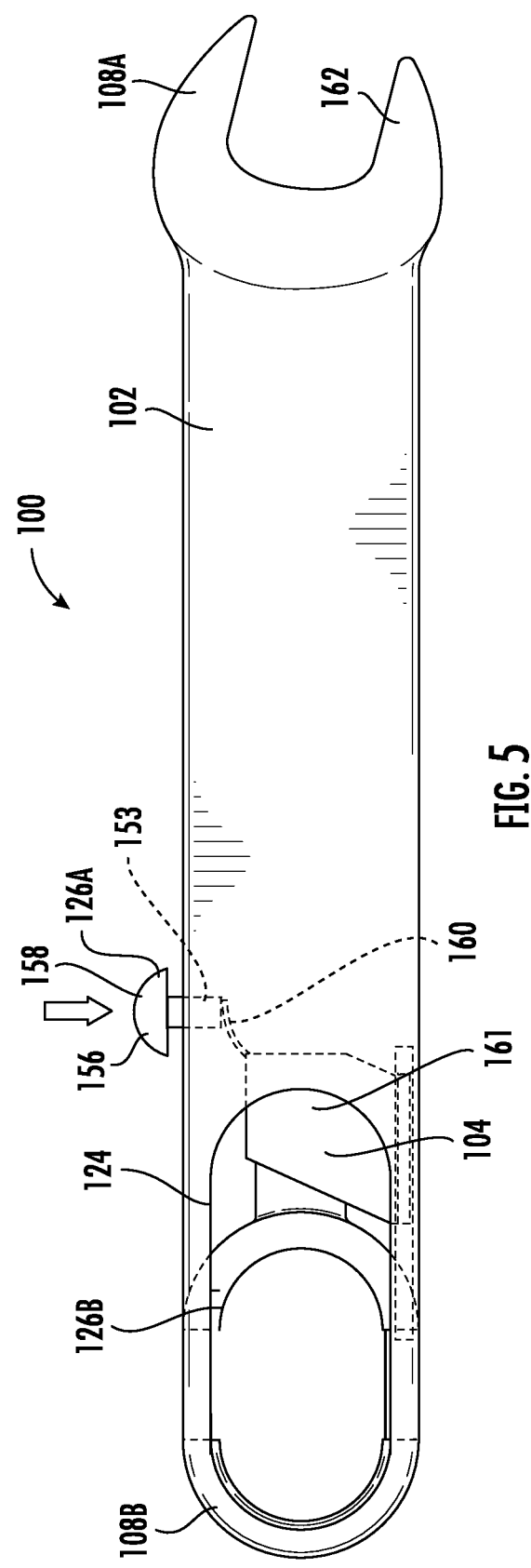

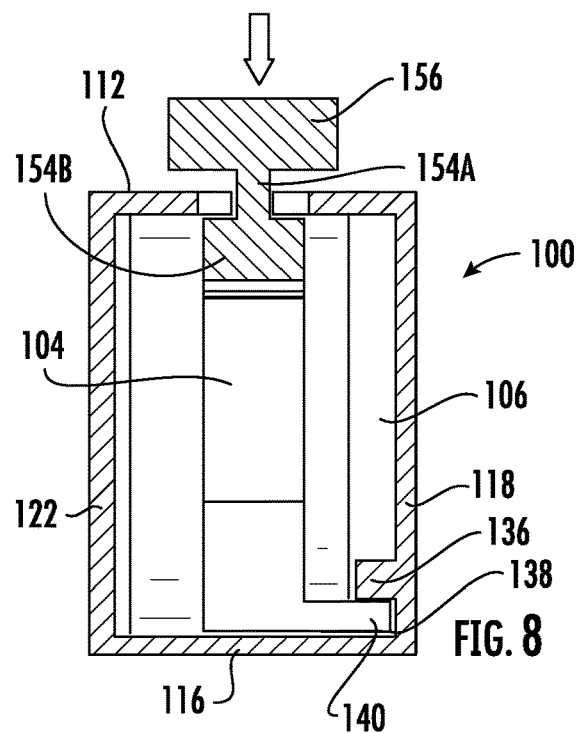
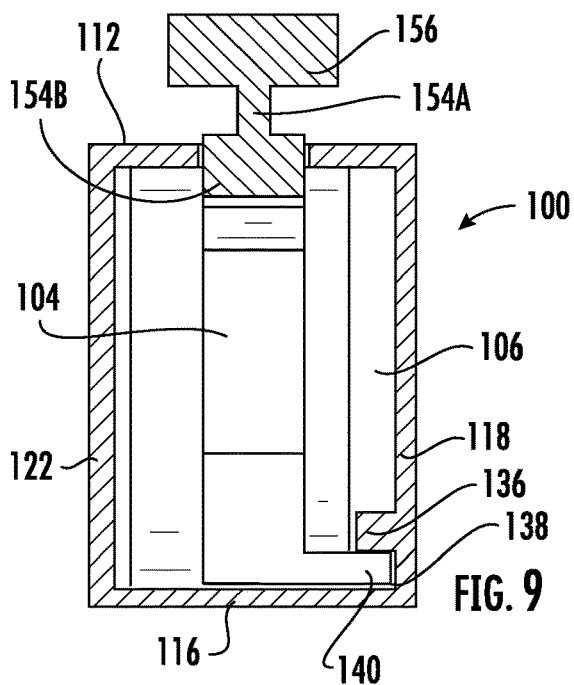
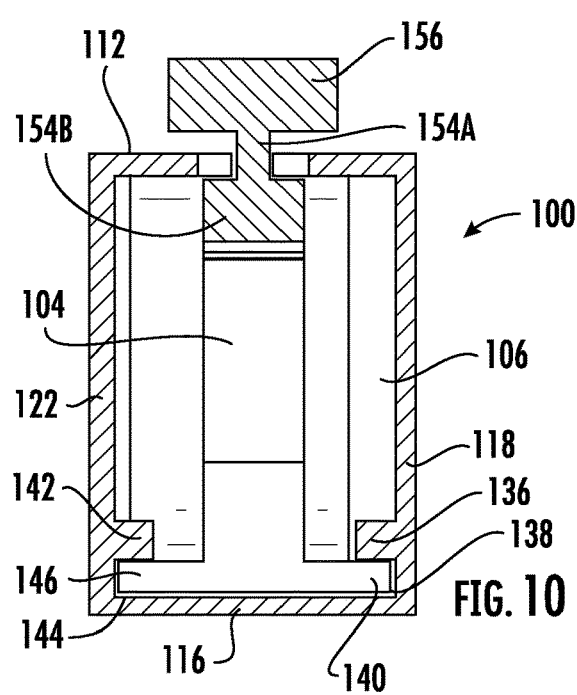

THREAD REPAIR HAND TOOL

FIELD

This disclosure relates to the field of hand tools. More particularly, this disclosure relates to a thread repair hand tool.

BACKGROUND

Thread repair hand tools are used to fix damaged threads of rods, typically made of metal or metal alloy. One example of a thread repair tool is described and shown in U.S. Pat. No. 6,921,236 entitled "Tool for Repairing Damaged Threads", the teachings of which are incorporated herein by reference. This patent describes a disc-like tool with different sized threaded apertures for repairing different sized threaded rods. In order to repair a threaded rod using this tool, the correct sized aperture is selected, and then the selected aperture is placed on an end of the threaded rod and then rotated along the threaded rod to repair threads thereon. When using this tool, it is necessary to start at an end of the threaded rod and rotate the tool through the threads of the threaded rod until reaching the damaged portion. Then, after the thread repair tool is rotated along the damaged portion, the tool must be rotated along threads the entire distance from the damaged portion of the rod to an end of the rod. For long rods, much rotating and energy is necessary to slowly get the tool to the damaged portion of the threaded rod and then back off the rod.

What is needed, therefore, is a tool that can more quickly and more easily be placed along a damaged portion of a threaded rod and repair such threaded rod.

SUMMARY

The above and other needs are met by a thread repair hand tool apparatus, the apparatus comprising a shell member comprising a cavity therein, a shell member first end, a shell member second end, wherein an inside surface along the shell member second end further comprises an inwardly facing first semi-circular threaded arc, and a shell member first wall and a shell member first aperture along the shell member first wall. The shell member further comprises a shell member second wall opposite the shell member first wall, a shell member third wall oriented orthogonal to the shell member first wall, the shell member third wall further comprising a shell member second aperture along the shell member third wall, and a shell member fourth wall opposite the shell member third wall, the shell member fourth wall further comprising a shell member third aperture along the shell member fourth wall. The thread repair hand tool apparatus further comprises a core member comprising a core member first end, the core member first end further comprising a biasing member extending out of the shell member first aperture. The core member further comprises a core member second end, the core member second end comprising an outwardly facing second semi-circular threaded arc. The core member further comprises a core member base configured to slide along a shell member second wall interior surface of the shell member second wall, wherein the core member is configured to move inside the shell member from a first configuration in which the first semi-circular threaded arc and the second semi-circular threaded arc are separated to a second configuration in which the first semi-circular threaded arc and the second semi-circular threaded arc are combined to form a full circular threaded arc.

Preferably, the shell member first end further comprises a wrench head. For embodiments including the wrench head, the wrench head is preferably sized to engage with nuts that include a threaded interior diameter the same size as a threaded interior diameter of the full circular threaded arc.

In a preferred embodiment, the shell member first aperture further comprises a shell member first aperture first wide section, a shell member first aperture narrow section, and a shell member first aperture second wide section and wherein the biasing member includes a narrow neck portion and a wide neck portion wherein the wide neck portion is configured to selectively engage with the shell member and lock the core member in place either by placing the wide neck portion into the shell member first aperture first wide section or by placing the wide neck portion into the shell member first aperture second wide section.

In a preferred embodiment, the shell member further comprises a shelf extending inward from the shell member third wall and defining a groove between the shell member second wall and the shelf; and wherein the core member further comprises a flange extending into the groove such that the core member is slidingly engaged with the shell member. Preferably, the shell member further comprises a second shelf extending inward from the shell member fourth wall and defining a second groove between the shell member second wall and the second shelf; and wherein the core member further comprises a second flange extending into the second groove such that the core member is slidingly engaged with the shell member.

In another aspect, a method for repairing threads of a threaded rod is disclosed, the method comprising providing a thread repair hand tool similar or identical to the embodiments described above, wherein the core member is configured to move inside the shell member from a first configuration in which the first semi-circular threaded arc and the second semi-circular threaded arc are separated to a second configuration in which the first semi-circular threaded arc and the second semi-circular threaded arc are combined to form a full circular threaded arc. The method preferably further comprises setting the thread repair hand tool to the first configuration; positioning the thread repair hand tool such that a threaded rod extends through the shell member second aperture and the shell member third aperture; moving the thread repair hand tool along the threaded rod until the thread repair hand tool is position adjacent to a section of the threaded rod that includes damaged threads; setting the thread repair hand tool to the second configuration; rotating the thread repair hand tool around the threaded rod such that the full circular threaded arc tightly rotates along the damaged threads to repair the damaged threads; setting the thread repair hand tool to the first configuration; and removing the thread repair hand tool from the threaded rod.

The summary provided herein is intended to provide examples of particular disclosed embodiments and is not intended to cover all potential embodiments or combinations of embodiments. Therefore, this summary is not intended to limit the scope of the invention disclosure in any way, a function which is reserved for the appended claims.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

FIG. 2 shows a shell member of the thread repair hand tool shown in FIG. 1;

FIG. 3 shows core member of the thread repair hand tool shown in FIG. 1;

FIG. 4 shows a plan view of the thread repair tool shown in FIG. 1;

FIG. 5 shows a side view of the thread repair tool of FIG. 1 shown in a first configuration;

FIG. 8 shows a cross-sectional view of the thread repair hand tool shown in FIG. 6 cut along line 8-8;

FIG. 9 shows a cross-sectional view of the thread repair hand tool shown in FIG. 7 cut along line 9-9;

FIG. 10 shows an alternate embodiment of the cross-sectional view shown in FIG. 8 including two flanges and two grooves instead of one flange and one groove.

Figure 1:
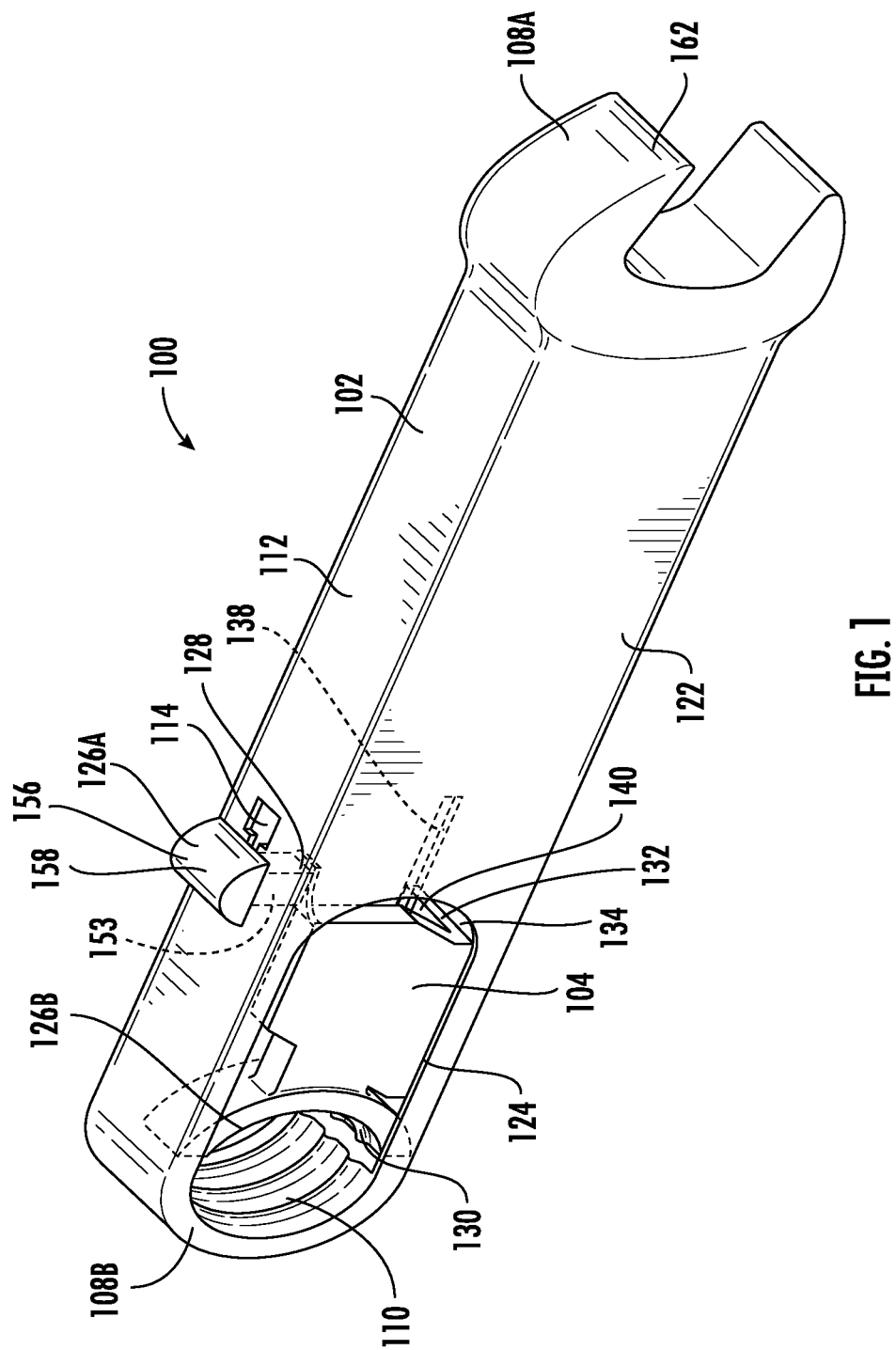
FIG. 1 shows a perspective view of a thread repair hand tool.

The figures are provided to illustrate concepts of the invention disclosure and are not intended to embody all potential embodiments of the invention. Therefore, the figures are not intended to limit the scope of the invention disclosure in any way, a function which is reserved for the appended claims.

DETAILED DESCRIPTION

A thread repair hand tool is disclosed, shown, and described herein. With reference to the Figures, any use of the terms "upper", "lower", "right", or "left" are for convenience of describing what is shown in the Figures. Although a specific embodiment of a thread repair hand tool is shown and described herein, other variations or modifications which accomplish the same results in the same way are intended to be contemplated and disclosed.

FIGS. 1 and 4-7 show a basic embodiment of a thread repair hand tool 100 including a shell member 102 and a core member 104. The core member 104 is configured to slide inside the shell member 102. FIG. 2 shows a perspective view of just the shell member 102 by itself, and FIG. 3 shows a perspective view of just the core member 104 by itself. The shell member 102 includes a cavity 106 inside the shell member where the core member 104 is located. The shell member 102 further includes a shell member first end 108A and a shell member second end 108B, wherein an inside surface along the shell member second end further includes an inwardly facing first semi-circular threaded arc 110. The shell member 102 further includes a shell member first wall 112 and a shell member first aperture 114 along the shell member first wall 112; a shell member second wall 116 opposite the shell member first wall 112; a shell member third wall 118 oriented orthogonal to the shell member 112 first wall; a shell member second aperture 120 along the shell member third wall 118; a shell member fourth wall 122 opposite the shell member third wall 118; and a shell member third aperture 124 along the shell member 20) fourth wall 122.

The core member 104 further includes a core member first end 126A which further includes a biasing member 128 extending out of the shell member first aperture 114. The core member further includes a core member second end 126B, the core member second end 126B comprising an outwardly facing second semi-circular threaded arc 130. The core member 104 further includes a core member base 132 configured to slide along a shell member second wall interior surface 134 of the shell member second wall 116. The various components of the core member 104 are preferably formed as a single piece of metal. Alternatively, multiple separate parts of the core member 104 can be attached together by welding or other attachment means known to persons having ordinary skill in the art.

Preferably, as shown most clearly in FIG. 8 and FIG. 9, the shell member 102 includes a shelf 136 extending inward from the shell member third wall 118 and defining a groove 138 between the shell member second wall 116 and the shelf 136. The core member 104 further includes a flange 140 extending into the groove 138 such that the core member 104 is slidingly engaged with the shell member 102. FIG. 10 shows an alternative embodiment in which the shell member 102 further includes a second shelf 142 extending inward from the shell member fourth wall 122 defining a second groove 144 between the shell member fourth wall 122 and the second shelf 142. In this embodiment, the core member 104 further includes a second flange 146 extending into the second groove 144.

The core member 104 is configured to move inside the shell member 102 from a first configuration (shown in FIG. 5) in which the first semi-circular threaded arc 110 and the second semi-circular threaded arc 130 are separated to a second configuration (shown in FIG. 7) in which the first semi-circular threaded arc 110 and the second semi-circular threaded arc 130 are combined to form a full circular threaded arc 147. The core member 104 is further configured to move back from the second configuration to the first configuration.

Figure 6:
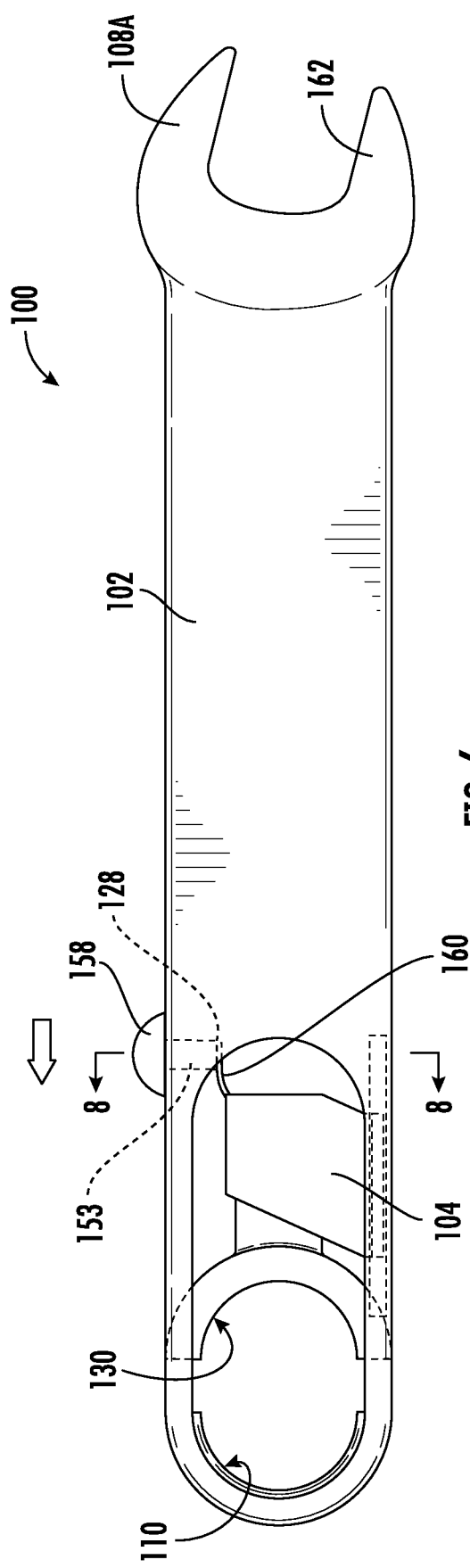
FIG. 6 shows a side view of the thread repair tool of FIG. 1 shown passing between the first configuration and a second configuration.
Figure 7:
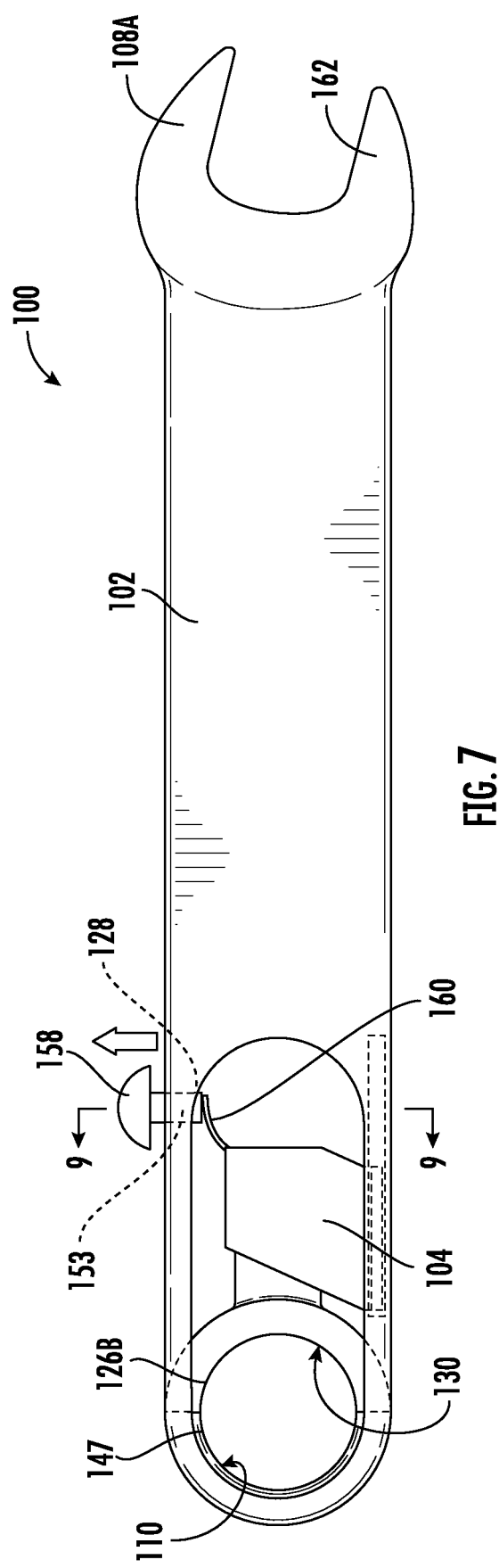
FIG. 7 shows a side view of the thread repair tool of FIG. 1 shown in the second configuration.

Preferably, the shell member first aperture 114 further comprises a shell member first aperture first wide section 148, a shell member first aperture narrow section 150, and a shell member first aperture second wide section 152. The biasing member 128 preferably includes a neck 153 including a narrow neck portion 154A and a wide neck portion 154B as shown in FIGS. 8-9 such that the biasing member 128 can selectively engage with the shell member 102 and lock the core member 104 in place either with the wide neck portion 154B engaged with the shell member 102 inside the shell member first aperture first wide section 148 or with the wide neck portion 154B engaged with the shell member 102 inside the shell member first aperture second wide section 152. Preferably, the biasing member 128 includes a button 156 at a distal end 158 of the biasing member 128 that can be depressed to slide the core member from the first position to the second position and vice versa. While depressed (as shown in FIG. 6, FIG. 8, and FIG. 10), the narrow neck portion 154A is sized to fit through the shell member first aperture narrow section 150 so that the core member 104 is permitted to move. However, the wide neck portion 154B will not fit through the shell member first aperture narrow section. Therefore, if the button 156 is not depressed, the core member 102 is either locked in the first configuration or the second configuration. An arch spring 160 preferably connects the neck 153 to a main body 161 of the core member to bias the neck 153 up through the shell member first aperture first wide section 148 or the shell member first aperture second wide section 152.

Preferably, the shell member first end 108A is formed in the shape of a wrench head 162. Preferably, the wrench head 162 is sized to engage with nuts that include a threaded interior diameter the same size as a threaded interior diameter of the full circular threaded arc 147. In other words, the wrench head 162 is sized to fit nuts that would fit on the same sized threaded rods as the size for which the full circular threaded arc 147 is sized to fit. Thread repair tools like the thread repair hand tool 100 can come in sets with a plurality of thread repair hand tools wherein each has different sized full circular threaded arcs and different sized wrench heads. Preferably the size of each respective full circular threaded arc is sized to be the same size as the respective wrench head on each thread repair hand tool.

The thread repair hand tool 100 is preferably made of metal or a metal alloy. However, other materials having physical characteristics similar to metals commonly used with hand tools can be used.

Figure 11:
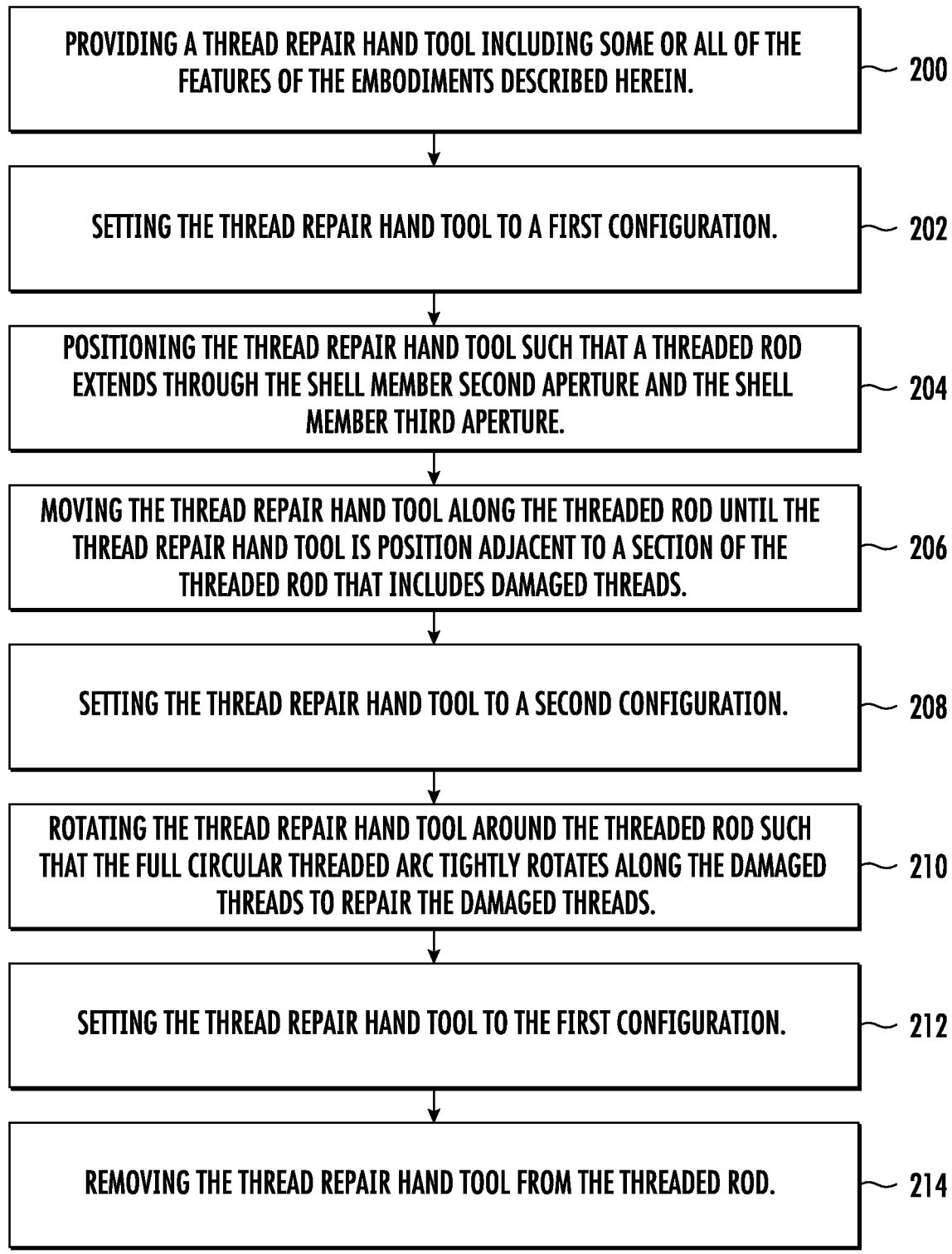
FIG. 11 shows a flowchart of a method for repairing a threaded rod using a thread repair hand tool.

In addition to the embodiments of the thread repair tool 100 described above, a method of repairing the threads of a threaded rod is disclosed. A flow chart of the method is shown in FIG. 11. The method includes 200 providing a thread repair hand tool including some or all of the features of the embodiments described above. The method further includes 202 setting the thread repair hand tool to a first configuration similar to the configuration shown in FIG. 5; 204 positioning the thread repair hand tool such that a threaded rod extends through the shell member second aperture and the shell member third aperture; 206 moving the thread repair hand tool along the threaded rod until the thread repair hand tool is position adjacent to a section of the threaded rod that includes damaged threads; 208 setting the thread repair hand tool to a second configuration similar to the configuration shown in FIG. 7; 210 rotating the thread repair hand tool around the threaded rod such that the full circular threaded arc tightly rotates along the damaged threads to repair the damaged threads; 212 setting the thread repair hand tool to the first configuration; and 214 removing the thread repair hand tool from the threaded rod.

The previously described embodiments of the present disclosure have many advantages, including being able to quickly position a thread repair hand tool proximate to a damaged thread section of a threaded rod without having to rotate a thread repair tool the entire length of the threaded rod. Some threaded rods are very long, in some cases longer than 1 meter, and the ability to quickly position a thread repair hand tool adjacent to damaged threads before engaging the full circular threaded arc to repair the damaged threads saves a substantial amount of time, particularly when repairing multiple threaded rods.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

Any element in a claim that does not explicitly state "means for" performing a specified function, or "step for" performing a specific function, is not to be interpreted as a "means" or "step" clause as specified in 35 U.S.C. § 112, ¶6. In particular, the use of "step of" in the claims herein is not intended to invoke the provisions of 35 U.S.C. § 112, ¶6.

What is claimed is:

1. A thread repair hand tool apparatus, the apparatus comprising:
   a shell member comprising:
      a cavity therein;
      a shell member first end;
      a shell member second end, wherein an inside surface along the shell member second end further comprises an inwardly facing first semi-circular threaded arc; and
      a shell member first wall and a shell member first aperture along the shell member first wall;
      a shell member second wall opposite the shell member first wall;
      a shell member third wall oriented orthogonal to the shell member first wall, the shell member third wall further comprising a shell member second aperture along the shell member third wall;
      a shell member fourth wall opposite the shell member third wall, the shell member fourth wall further comprising a shell member third aperture along the shell member fourth wall;
   a core member comprising:
      a core member first end, the core member first end further comprising a biasing member extending out of the shell member first aperture;
      a core member second end, the core member second end comprising an outwardly facing second semi-circular threaded arc;
      a core member base configured to slide along a shell member second wall interior surface of the shell member second wall;
   wherein the core member is configured to move inside the shell member from a first configuration in which the first semi-circular threaded arc and the second semi-circular threaded arc are separated to a second configuration in which the first semi-circular threaded arc and the second semi-circular threaded arc are combined to form a full circular threaded arc.

2. The thread repair hand tool apparatus of claim 1 wherein the shell member first end further comprises a wrench head.

3. The thread repair hand tool apparatus of claim 2 wherein the wrench head is sized to engage with nuts that include a threaded interior diameter the same size as a threaded interior diameter of the full circular threaded arc.

4. The thread repair hand tool apparatus of claim 1 wherein the shell member first aperture further comprises a shell member first aperture first wide section, a shell member first aperture narrow section, and a shell member first aperture second wide section and wherein the biasing member includes a narrow neck portion and a wide neck portion wherein the wide neck portion is configured to selectively engage with the shell member and lock the core member in place either by placing the wide neck portion into the shell member first aperture first wide section or by placing the wide neck portion into the shell member first aperture second wide section.

5. The thread repair hand tool apparatus of claim 1 wherein the shell member further comprises a shelf extending inward from the shell member third wall and defining a groove between the shell member second wall and the shelf; and wherein the core member further comprises a flange extending into the groove such that the core member is slidingly engaged with the shell member.

6. The thread repair hand tool apparatus of claim 5 wherein the shell member further comprises a second shelf extending inward from the shell member fourth wall and defining a second groove between the shell member second wall and the second shelf; and wherein the core member further comprises a second flange extending into the second groove such that the core member is slidingly engaged with the shell member.

7. A method for repairing threads of a threaded rod, the method comprising:
    providing a thread repair hand tool comprising:
        a shell member comprising:
            a cavity therein;
            a shell member first end;
            a shell member second end, wherein an inside surface along the shell member second end further comprises an inwardly facing first semi-circular threaded arc; and
            a shell member first wall and a shell member first aperture along the shell member first wall;
            a shell member second wall opposite the shell member first wall;
            a shell member third wall oriented orthogonal to the shell member first wall, the shell member third wall further comprising a shell member second aperture along the shell member third wall;
            a shell member fourth wall opposite the shell member third wall, the shell member fourth wall further comprising a shell member third aperture along the shell member fourth wall;
        a core member comprising:
            a core member first end, the core member first end further comprising a biasing member extending out of the shell member first aperture;
            a core member second end, the core member second end comprising an outwardly facing second semi-circular threaded arc;
            a core member base configured to slide along a shell member second wall interior surface of the shell member second wall;
        wherein the core member is configured to move inside the shell member from a first configuration in which the first semi-circular threaded arc and the second semi-circular threaded arc are separated to a second configuration in which the first semi-circular threaded arc and the second semi-circular threaded arc are combined to form a full circular threaded arc
    setting the thread repair hand tool to the first configuration;
    positioning the thread repair hand tool such that a threaded rod extends through the shell member second aperture and the shell member third aperture;
    moving the thread repair hand tool along the threaded rod until the thread repair hand tool is position adjacent to a section of the threaded rod that includes damaged threads;
    setting the thread repair hand tool to the second configuration;
    rotating the thread repair hand tool around the threaded rod such that the full circular threaded arc tightly rotates along the damaged threads to repair the damaged threads;
    setting the thread repair hand tool to the first configuration; and
    removing the thread repair hand tool from the threaded rod.

\* \* \* \* \*